Oct. 17, 1944.   C. M. BEYER   2,360,467
ELECTRICAL DEVICE
Filed Jan. 12, 1943
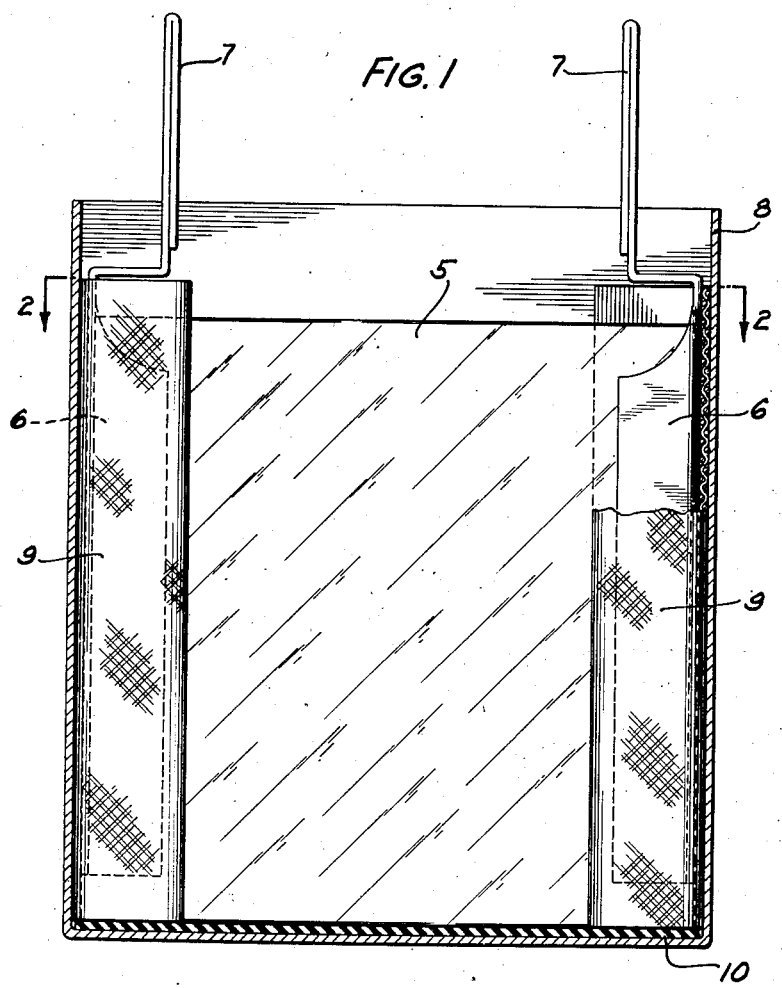
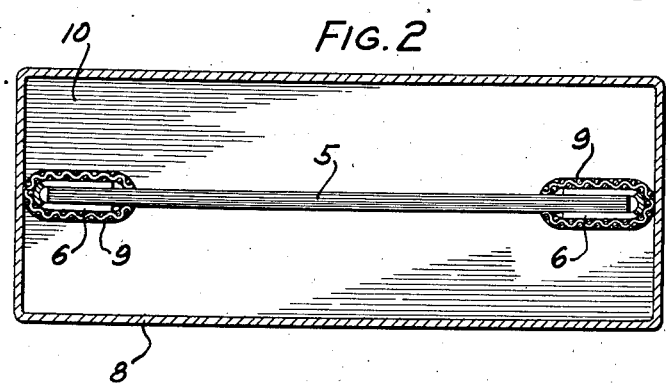
INVENTOR
C. M. BEYER
BY Harry L. Duft
ATTORNEY Patented Oct. 17, 1944

2,360,467

UNITED STATES PATENT OFFICE 2,360,467

ELECTRICAL DEVICE

Charles M. Beyer, Orange, N. J., assignor to Western Electric Company, Incorporated, New York, N. Y., a corporation of New York Application January 12, 1943, Serial No. 472,124

5 Claims. (Cl. 175—41)

This invention relates to electrical devices and more particularly to electrical condensers.

In the manufacture of laminated condenser bodies of the type which are placed in a container and the container filled with a potting compound to protect the condenser body, it is sometimes the practice to line the interior walls of the container with a suitable insulating material, such, for example, as mica.

An object of this invention is to provide an efficient and effective insulator for an electrical condenser.

In accordance with one embodiment of this invention, the exposed edges of an electrical condenser body may be covered by a sheath of impregnated glass textile material and the condenser body placed in a container. The container is then filled with a suitable potting compound.

Other objects and advantages of this invention will be apparent from the following detailed description taken in conjunction with the drawing, wherein:

Fig. 1 is a vertical section of a condenser constructed in accordance with this invention, and Fig. 2 is a sectional view along the line 2—2 of Fig. 1.

Referring now to the drawing, an electrical condenser constructed in accordance with one embodiment of this invention is shown comprising a laminated condenser body 5 of substantially rectangular shape. Metallic clamps 6 are secured to opposite edges of the body and the upper portion of each of these metallic clamps is extended to form a terminal 7 for the condenser.

The condenser body 5 is adapted to be positioned in a metallic container 8. In order to insulate the condenser body from the sides of the container and to support it within the container, sheaths 9 are positioned over the clamps 6 at either side of the condenser body. These sheaths completely enclose the clamps and at the same time engage the sides of the container adjacent the clamps, the size of the container being selected to obtain a relatively tight fit between the sheath insulated condenser body and the container.

It is, of course, desirable that the sheath clamp the edges of the condenser body to which it is applied with sufficient force to remain in position while the condenser body is assembled in the container and during the subsequent potting operation. In practice it has been found that a satisfactory sheath may be obtained by impregnating a glass textile sleeving material with a thermosetting compound, such as a phenol formaldehyde varnish, and baking the impregnating material to obtain the required physical properties and shape in the material. The sheaths may also be made by forming a tape into the quasi-cylindrical shape shown in cross section in Fig. 2, impregnating the tape and treating the impregnated tape to obtain the desired set to retain the sheath in position on the condenser body.

Prior to assembling the sheathed condenser body in the container, a strip 10 of a suitable insulating material may be placed at the bottom of the container to insulate the base of the condenser body from the container. It would also be possible to apply a sheath of insulating material as described to the lower edge of the condenser body to serve as an insulator in the same way as the strip 10. Potting compound is then poured into the container to a depth sufficient to completely immerse the condenser body.

It will be apparent that by following the present invention, a considerable reduction is effected in the amount of insulating material required to insulate a condenser body of this type. It will also be apparent that it is a much simpler manufacturing operation to apply a sheath to the edges of the condenser body, as described herein, than it is to apply insulation to the interior walls of the condenser container. This, of course, results in a considerable reduction in the cost of manufacture of this type of condenser.

While but one embodiment of this invention has been shown and described, it will be understood that many changes and modifications may be made therein without departing from the spirit and scope of the present invention.

What is claimed is:

1. An electrical condenser comprising a condenser body having clamping terminal members along two opposed edges, a container, and a slotted tubular insulating member of glass textile material impregnated with a resin positioned over each of said clamping members, said container being of such width as to cause said insulating members to engage opposed sides of the container to retain said condenser body in position during assembly.

2. An electrical condenser comprising a condenser body having clamping terminal members along two opposed edges, a container, a slotted tubular insulating member of glass textile material impregnated with a resin positioned over each of said clamping members, said container being of such width as to cause said insulating members to engage opposed sides of the container to retain said condenser body in position during assembly, and a potting compound in said container embedding said condenser body.

3. An electrical condenser comprising a container, a condenser body in said container, and a slotted tubular member of insulating material positioned over an exposed side edge of said body and bearing against said container, said member exerting sufficient clamping pressure on said body to retain said member in position thereon during the assembly of said body in said container.

4. An electrical condenser comprising a container, a condenser body in said container, and a slotted tubular member of impregnated textile material positioned over an exposed side edge of said body bearing against said container, said member exerting sufficient clamping force on said body to retain said member in position thereon during the assembly of said body in said container.

5. An electrical condenser comprising a container, a condenser body in said container, a slotted tubular member of impregnated textile material positioned over an exposed side edge of said body bearing against said container, said member exerting sufficient clamping force on said body to retain said member in position thereon during the assembly of said body in said container, and a potting compound in said container embedding said condenser body.

CHARLES M. BEYER.